United States Patent [19]

Mercat

[11] Patent Number: 5,029,486
[45] Date of Patent: Jul. 9, 1991

[54] SPEED VARIATOR WITH JAMMING SHOES

[75] Inventor: Jean-Pierre Mercat, Renault, France

[73] Assignee: STE Look, Nevers, France

[21] Appl. No.: 440,762

[22] Filed: Sep. 18, 1989

[30] Foreign Application Priority Data

Sep. 27, 1988 [FR] France .................. 88 12584

[51] Int. Cl.[5] .................. F16H 29/04; B62M 23/00
[52] U.S. Cl. .................. 74/117; 280/236
[58] Field of Search .............. 280/210, 229, 236, 247,
280/248; 192/79, 37, 45.1, 41 R; 475/297, 166,
170; 74/594.1, 594.2, 116, 117

[56] References Cited

U.S. PATENT DOCUMENTS

| | | | |
|---|---|---|---|
| 1,832,383 | 11/1931 | Hall | 74/117 |
| 2,521,067 | 9/1950 | Kenison | 74/117 |
| 4,164,153 | 8/1979 | Moritsch et al. | 74/594.1 X |

FOREIGN PATENT DOCUMENTS

| | | |
|---|---|---|
| 0032888 | 7/1981 | European Pat. Off. . |
| 0208473 | 1/1987 | European Pat. Off. . |
| 0273023 | 6/1988 | European Pat. Off. . |
| 0280481 | 8/1988 | European Pat. Off. . |
| 567857 | 6/1923 | France . |
| 773965 | 5/1934 | France .................. 280/236 |
| 981625 | 1/1949 | France .................. 280/236 |
| 520404 | 3/1955 | Italy .................. 74/117 |
| 52657 | 5/1981 | Japan .................. 74/117 |
| 37004 | 12/1935 | Netherlands .................. 74/116 |
| 454640 | 10/1936 | United Kingdom .................. 74/117 |

Primary Examiner—Allan D. Herrmann
Assistant Examiner—Khoi Q. Ta
Attorney, Agent, or Firm—Young & Thompson

[57] ABSTRACT

The driving element and driven element of the speed variator are rotatably mounted on two parallel axes, one of which is displaceable with respect to the other. These two elements are connected to each other by a series of driving crank-arms, one end of which is pivotally coupled to one element at different points of a circle having the same axis whilst the opposite end is intended to be coupled with the other element at a point of a circle having the same axis as that other element by a unidirectional coupling. These couplings consist of shoes pivotally mounted on the corresponding ends of the driving crank-arms and being each capable of jamming in turn on a circular track provided on the corresponding element of the variator whilst the other shoes slide on the track, all the driving crank-arms being intended to revolve in the same diametral plane or in two parallel planes.

8 Claims, 7 Drawing Sheets

SPEED VARIATOR WITH JAMMING SHOES

BACKGROUND OF THE INVENTION

1. Field of the Invention

The present invention relates to speed variators which permit an infinite number of speed ratios between two different rotary shafts over a more or less broad range. Speed variators of this type have a very large number of potential applications. They may thus be employed in motor vehicles or in cycles, or else in any machines or mechanical devices.

2. Description of the Prior Art

More precisely, the invention is concerned with speed variators of the type comprising two elements consisting respectively of a driving element and a driven element rotatably mounted on two parallel axes, one of which is displaceable with respect to the other. These two elements are connected to each other by means of a series of driving crank-arms pivotally coupled at one end with one of said elements at different points of a circle having the same axis whilst their opposite end is intended to be coupled with the other element at a point of a circle having the same axis as said element, by virtue of unidirectional coupling means. Thus the variation in spacing between the axes of the two elements (driving and driven element) of this variator permits a continuous variation of the transmission ratio of this latter.

European patent EP 208,473 describes a speed variator of this type. In this device, one of the rotating transmission elements carries a series of articulated arms, the ends of which constitute pawls which are intended to engage with a ratchet wheel provided with an internal set of teeth. Modification of the eccentric position of one of the rotating elements with respect to the other produces a variation of the angular position of the coupling arms and consequently a variation of the transmission ratio.

However, this solution is subject to a certain number of disadvantages. One of these lies in the fact that coupling between the two rotary transmission elements takes place only when the pawl in service is engaged at the bottom of a space between two teeth of the ratchet wheel. Moreover, this solution does not offer fully satisfactory mechanical strength since the teeth of the ratchet wheel are subjected to extremely high stresses.

It is for these reasons that the present invention is concerned with a variator which is so designed as to remove these drawbacks.

SUMMARY OF THE INVENTION

To this end, the variator of the type recalled in the foregoing is distinguished by the fact that the means for coupling the driving crank-arms with one of the elements of said variator consist of shoes pivotally mounted on the corresponding ends of said crank-arms and each capable of jamming in turn on a circular track provided on the corresponding element of the variator whilst the other shoes then slide on said track, all the driving crank-arms being intended to revolve in the same diametral plane.

By virtue of this arrangement, under the action of rotation of the driving element of said variator, the coupling shoes carried by the driving crank-arms come into the jamming position one after the other in succession. Thus the movement of engagement of another coupling shoe with the opposite rotary element takes place at any point of the track or of the circular groove of this latter as soon as jamming of said shoe occurs. Moreover, the arrangement provided ensures fully satisfactory mechanical strength since coupling takes place by jamming over a relatively large contact surface.

In an advantageous embodiment of the variator in accordance with the invention, the track for jamming the coupling shoes has two concentric portions located on each side of these latter, namely an annular groove of triangular or trapezoidal cross-section and a ring having a cylindrical surface, each shoe being provided in oppositely facing relation with portions having the same shape.

By virtue of its design concept this form of construction permits particularly effective jamming of the coupling shoes. It also permits the transmission of high driving torques by reason of the large surface area of the coupling shoes which is applied against the corresponding jamming tracks.

In accordance with another distinctive feature of this particular embodiment, since the driving element of the variator has a larger diameter than the driven element, the driving crank-arms are pivotally coupled to the driven element whose axis is stationary whilst the axis of the driving element is movable, the groove and the cylindrical ring of the track for jamming the coupling shoes being provided on the driving element.

DESCRIPTION OF THE PREFERRED EMBODIMENTS

As has already been mentioned, the variator shown by way of example in FIGS. 1 to 8 is fitted on the rear wheel of a bicycle.

Figure 1:
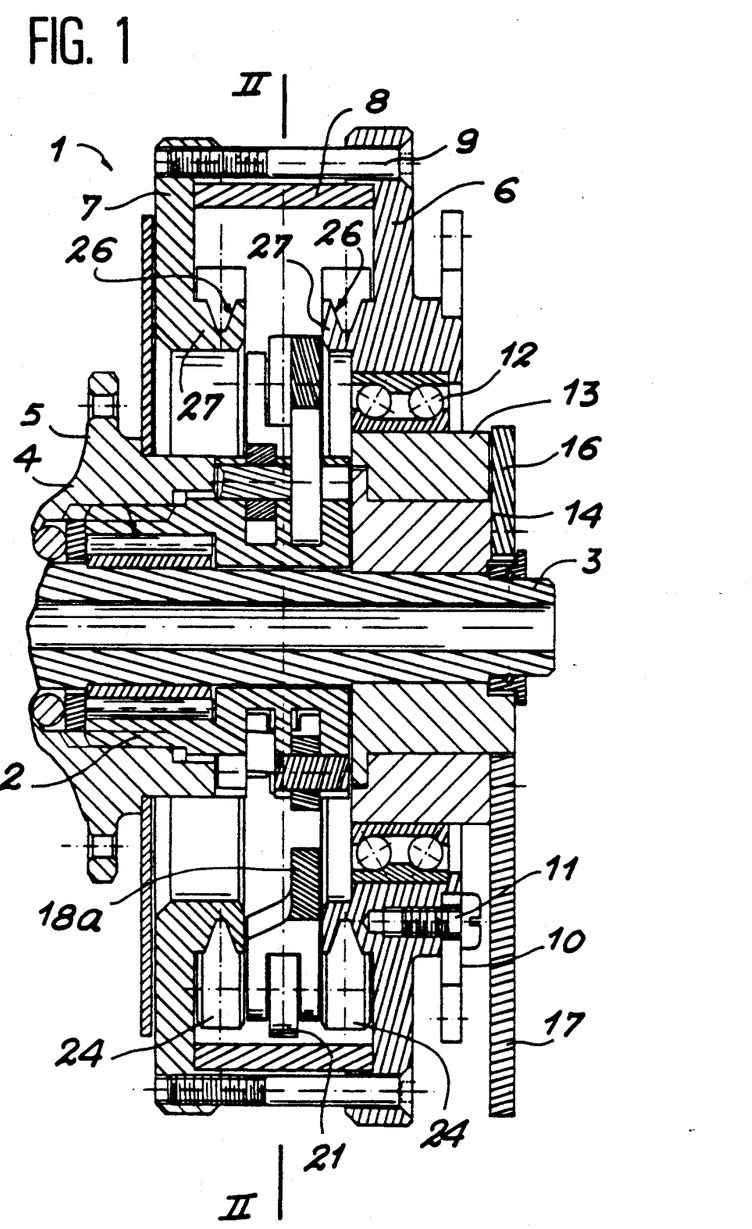
FIG. 1 is an axial sectional view of a speed variator in accordance with the invention which is fitted on the rear wheel of a bicycle, the driving and driven elements being shown in a non-eccentric position.

The driving and driven elements of said variator are constituted respectively by an external drum designated by the general reference 1 and an internal sleeve 2 rotatably mounted about the axle 3 of the corresponding wheel with interposition of a needle bearing 4, one end of said sleeve being screwed within the hub 5 of the wheel to be driven. So far as the drum 1 is concerned, said drum is constituted by the assembly of two side cheeks 6 and 7 and of an intermediate cylindrical ring 8, these parts being rigidly fixed by means of a series of bolts 9.

On the outer cheek 6 of said drum is mounted the rear pinion 10 for driving the corresponding wheel which is intended to receive the chain of the pedal crank gear, said pinion being fixed in position by means of a series of screws 11. The drum 1 is rotatably mounted around a ball bearing 12 carried by a ring 13, said ring being in turn mounted around an inner ring 14 placed on the fixed axle 3 of the corresponding wheel.

It should be noted in this connection that said rings both have a cylindrical external contour and are engaged one inside the other but that the cylindrical housing 15 provided within the outer ring 13 for receiving the inner ring 14 is located off-center. The centers O and $O_1$ of these two rings are therefore separate and distinct from each other. Furthermore, the inner ring 14 itself is mounted eccentrically on the wheel axle 3. In fact, the center O of the housing which is provided within said ring and through which the axle passes is displaced off-center with respect to the center $O_1$ of said ring. Since the axis O is fixed by definition, this arrangement makes it possible to displace the axis $O_1$ of the outer ring 13 either in order to make it coincide with the center O of the fixed axle 3 (position shown diagrammatically in FIG. 4) or in order to move said axle away from the line X-Y to a greater or lesser extent, for example in order to place it in the position illustrated in FIG. 5, in which there is a spacing E between the axes O and $O_1$. The variation of said spacing is controlled by rotating the two eccentric rings 13 and 14 with respect to each other. To this end, these two rings carry operating levers 16 and 17 respectively which are actuated by suitable control means (not shown) placed at the disposal of the user of the corresponding cycle.

Figure 2:
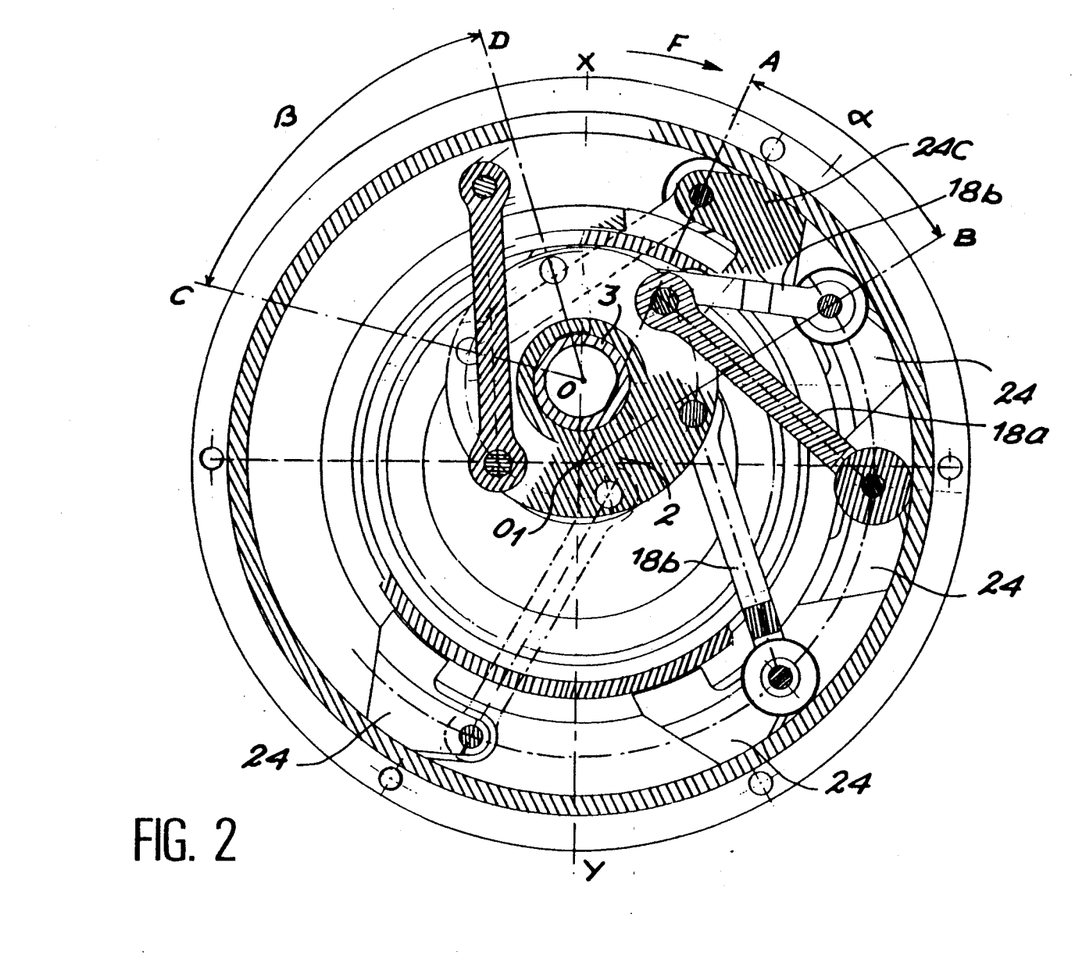
FIG. 2 is a sectional view of the same variator along different section planes parallel to the median transverse plane II—II of FIG. 1, the driving and driven element of the variator being shown in the eccentric position.
Figure 3:
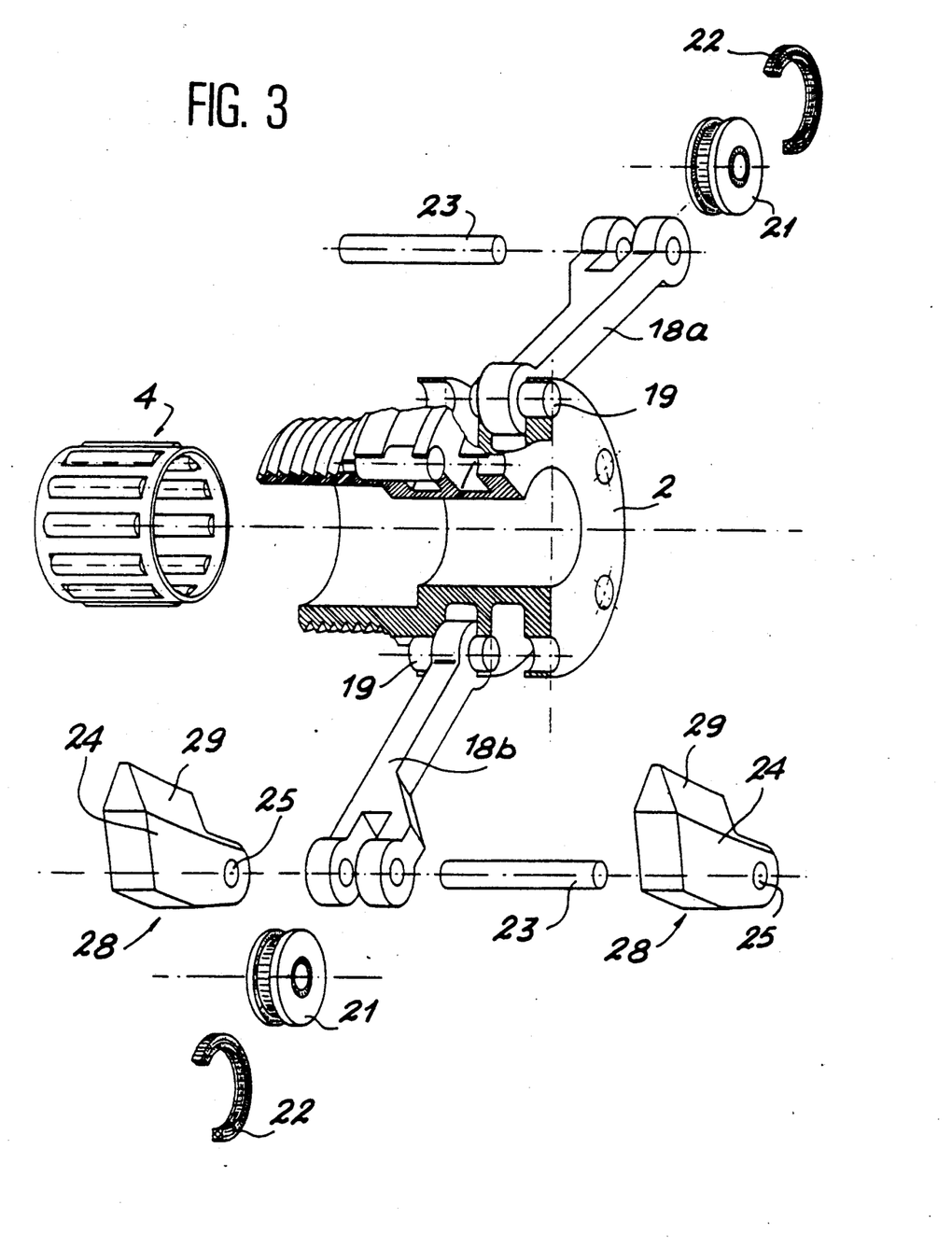
FIG. 3 is an exploded view in perspective showing certain main components of the present variator.
Figure 4:
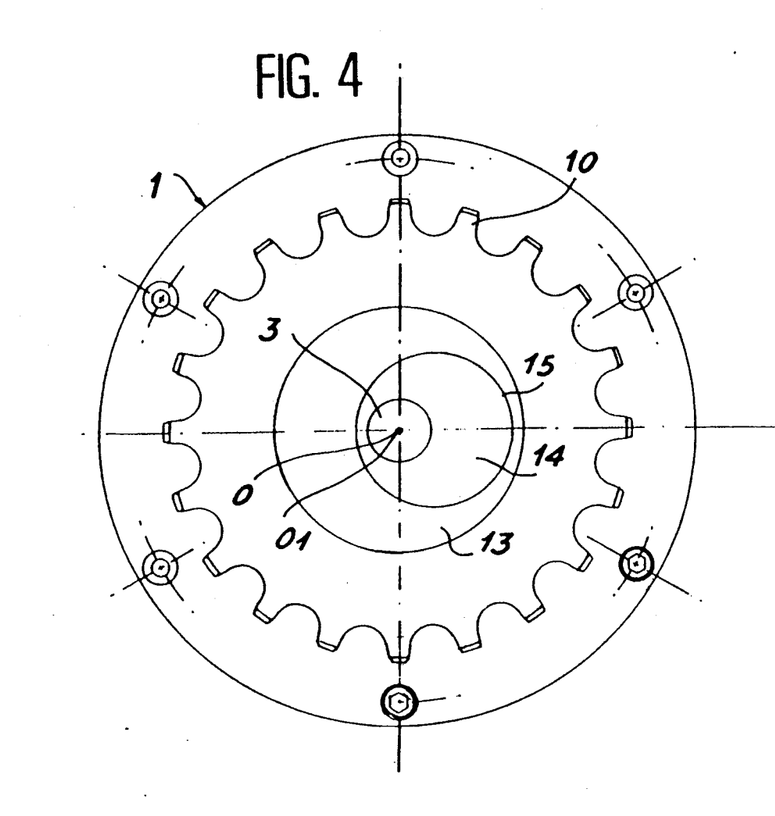
FIGS. 4 and 5 are schematic views illustrating the means for varying the eccentric displacement which can be carried out between the driving element and the driven element of the present variator.
Figure 5:
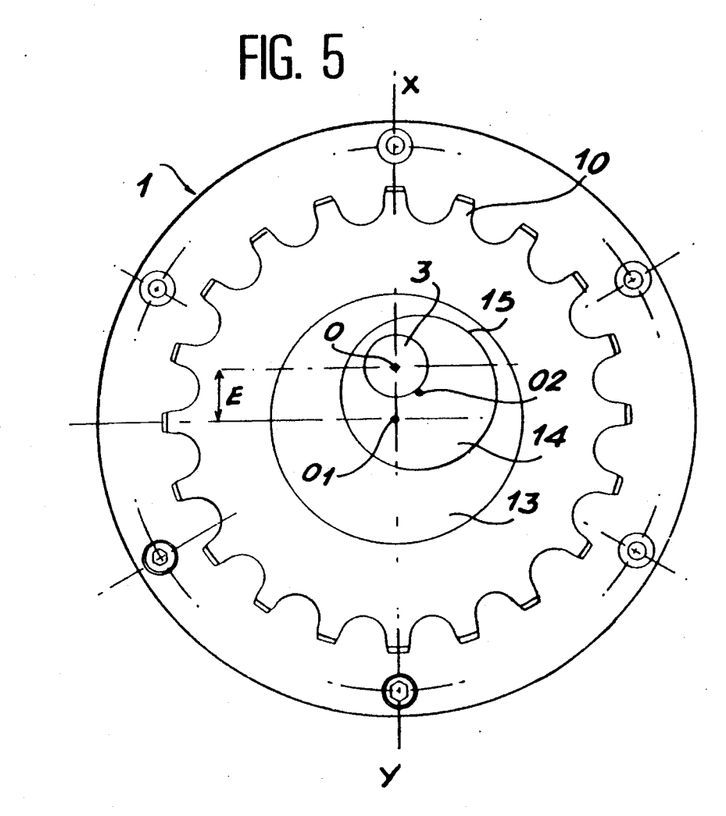

The driven element of the variator, namely the rotating sleeve 2 in the case considered, carries two series of driving crank-arms 18a and 18b which are disposed alternately in two distinct diametral planes. The inner ends of said crank-arms are pivoted to the driven sleeve 2 by means of pivot-pins 19. The outer end of each crank-arm has the shape of a fork, a roller 21 fitted with a rolling strip 22 of elastic material being placed between the two arms of said fork. Said roller is freely mounted for rotation about a cross-pin 23 which also serves as a pivot-pin for two jamming shoes 24 placed on each side of the corresponding fork. These shoes are intended to constitute unidirectional coupling members between the driving drum 1 and the driving crank-arms 18a and 18b carried by the driven sleeve 2. It should be pointed out in this connection that the bore 25 provided in each shoe 24 for the insertion of its pivot-pin 23 is displaced in the angular direction with respect to the body of said shoe. The direction of said displacement is determined by the direction of rotation F of the driving drum of the variator so as to ensure that, at the time of rotation of said drum, automatic jamming of the shoes takes place at least in one of the pairs of coupling shoes, under the conditions set forth hereinafter.

Figure 6:
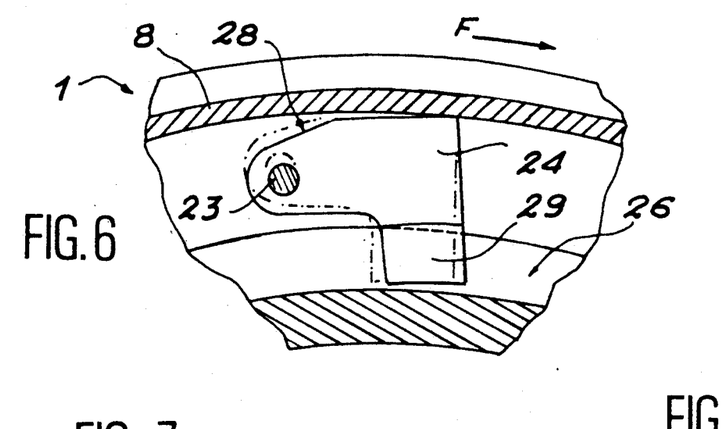
FIG. 6 is a fragmentary view in cross-section taken along the plane II—II of FIG. 1 and showing one of the unidirectional coupling components provided between the driving element and the driven element.
Figure 7:
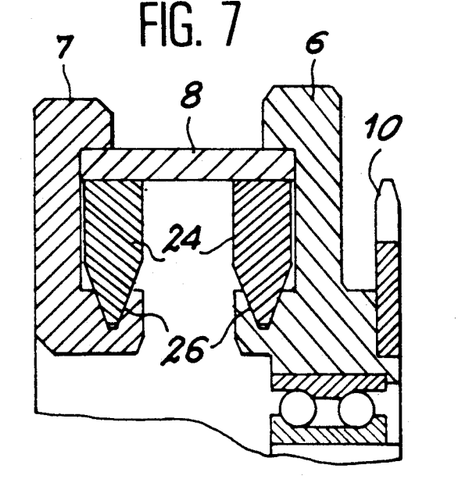
FIGS. 7 and 8 are two fragmentary views in transverse cross-section showing two details of said variator.
Figure 8:
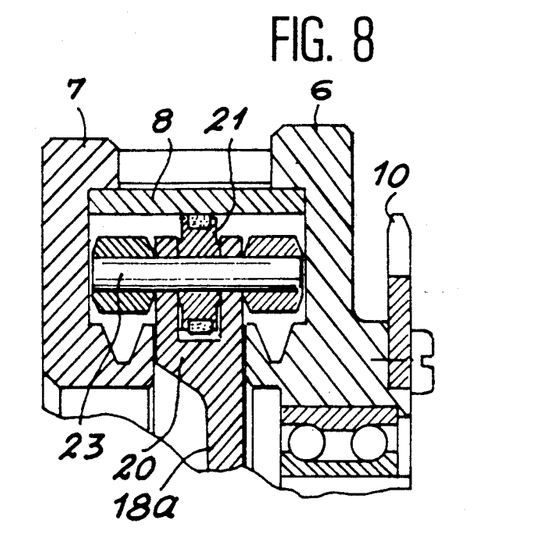

In the example illustrated, the jamming track of the coupling shoes 24 has two concentric portions located on each side of this latter, namely an outer portion formed by the ring 8 having a cylindrical surface and an inner portion constituted by two circular grooves 26 having a triangular profile. The cylindrical outer track 8 is common to the two series of shoes 24 located on each side of the driving crank-arms 18a and 18b. So far as each grove 26 is concerned, said groove is specific to one of these two series of shoes. To this end, said two grooves, which are formed in inner shoulders 27 of the side cheeks 6 and 7 of the drum 1, are located in the corresponding two diametral planes.

Each shoe 24 is provided on the outside with a slightly convex curved face 28 which is located opposite to the cylindrical outer track 8. On the other hand, each shoe is provided on the inside with a wedge-shaped portion 29 which is engaged within the corresponding groove 26 and is adapted to jam therein, the slope of the inclined faces of said wedge being identical with the slope of the groove walls.

The operation of the variator in accordance with the invention is as follows:

1)—EQUAL SPEED BETWEEN THE DRIVING ELEMENT DRIVEN ELEMENT

When the axis $O_1$ of the driving drum 1 is in a position of coincidence with the center O of the wheel axle 3 (centered position shown in FIG. 4), the different jamming shoes 24 are all placed on the same circumference. Since they are thus at equal distance from their axis of rotation, no differential velocity appears between them. In consequence, the driven sleeve 2 is driven at the same speed as the driving drum 1 and the toothed pinion 10 which is rigidly fixed thereto.

2)—VARIATION IN SPEED BETWEEN THE DRIVING ELEMENT AND THE DRIVEN ELEMENT

By rotating the two eccentric rings 13 and 14 around each other, it is possible to displace the axis $O_1$ of the outer ring 13 and therefore the axis of rotation of the driving drum 1 with respect to the wheel axle so as to produce an eccentric displacement E of more or less substantial value. This eccentric displacement causes the driving crank-arms 18a and 18b to take up different angular positions as shown in FIG. 2. In consequence, the angles through which the different jamming shoes 24 travel become different.

Jamming of the shoes 24 of each pair then takes place in the angular sector within which said shoes are located nearest the center O of the wheel. As shown in FIG. 2, the sector concerned is delimited by the radii $O_1A$ and $O_1B$ and corresponding to the angle α. In consequence, the shoes 24c of the pair located at this point within said sector α are caused to jam between the outer cylindrical track 8 and the inner grooves 26, with the result that they then effect a coupling between the driving drum 1 and the driving crank-arms of the driven sleeve.

Taking into account the relative angular displacement between the jamming shoes 24 and the inner ends of the driving crank-arms, the corresponding portion of the driven sleeve 2 passes through the angle $\beta$ included between the radii OC and OD while the shoes 24c considered in turn pass through the angle $\alpha$. At this point, however, the angle $\alpha$ is smaller than the angle $\beta$. This accordingly results in a difference in speed between the driving drum and the driven sleeve. By continuously varying the value of eccentric displacement E, a variation of this difference in speed is therefore obtained by this means and is also continuous.

It is worthy of note that each pair of shoes becomes a driving pair in its turn, over part of the range of travel about the wheel axle. It should be noted in this connection that a pair of shoes passes out of the traction zone corresponding to its jamming period at the precise moment when the following pair passes into said zone, their speed being identical at this instant. In the meantime, all the other shoes slide on the tracks which are located opposite. Furthermore, the rollers 21 facilitate this sliding motion by rolling at that time against the cylindrical ring 8.

By virtue of the design concept of the coupling elements constituted by the jamming shoes 24, the coupling between the driving drum and the crank-arms which actuate the driven sleeve can take place in any position, which is not the case with a coupling system involving the use of pawls which cooperate with a ratchet wheel. Moreover, it is thus possible to transmit very high torques by virtue of the very fact that the jamming surfaces of the shoes 24 are very large. This clearly results from the presence of the wedges 29 which are applied against the corresponding walls of the grooves 26 of triangular profile. The possibility of transmitting high values of torque also results from the fact that, in the case considered, each driving crank-arm carries not one jamming shoe but two shoes which are placed on each side of its outer end.

It should also be observed that the conditions of jamming of the coupling shoes are excellent. In fact, jamming of each shoe takes place automatically by virtue of its elevation and its abutment between the outer track formed by the cylindrical ring 8 and the inner track constituted by on of the two grooves 26 of triangular profile, elevation of the shoes being caused by the angular displacement of their pivot-pin 23 with respect to their jamming body. However, various alternative forms of construction can be considered for the jamming shoes which are provided at the outer ends of the driving crank-arms.

Figure 9:
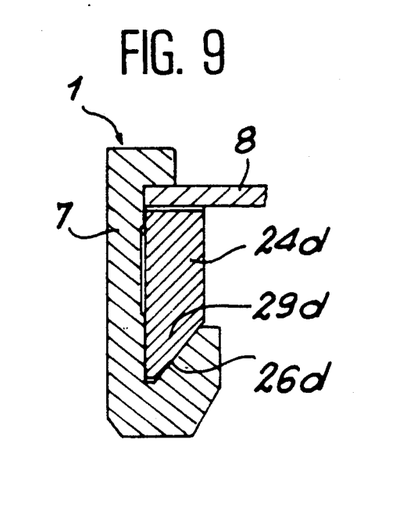
FIGS. 9 and 10 are fragmentary views in cross-section which are similar to FIG. 7 and illustrate two other forms of construction of the coupling components.

Thus FIG. 9 illustrates an alternative embodiment in which the wedge 29d of each corresponding shoe 24d has a single slope. It will be readily apparent that, in this case, the annular grooves 26d have a corresponding profile. As in the previous instance, provision is made for an outer ring 8 constituting a common cylindrical track for the two pairs of shoes provided at the outer end of the driving crank-arms.

Figure 10:
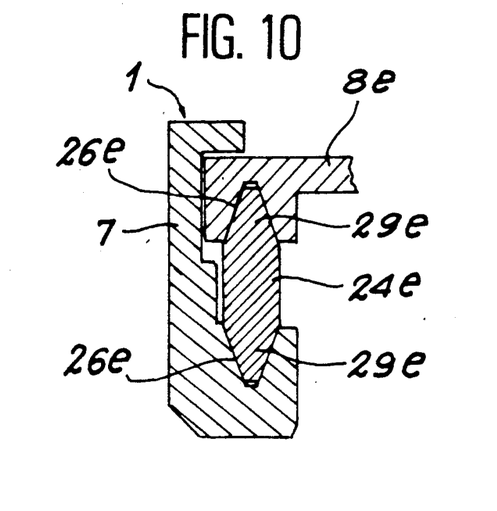

FIG. 10 illustrates another alternative embodiment in which the corresponding jamming shoes 24e have a wedge 29e both externally and internally. In this case the side cheeks 6 and 7 of the drum 1 are provided as before with two grooves 26e of triangular cross-section. In addition, however, the corresponding outer cylindrical ring 8e is in turn provided with two similar grooves 26e for receiving the wedges 29e of the shoes which are provided on the outside of these latter.

In these different cases, the shape of the cross-section of the jamming wedges and of the corresponding grooves could vary and could assume suitable shapes having a triangular contour, a trapezoidal contour or the like.

If so required, instead of having a pair of two shoes at their outer end, the driving crank-arms 18a and 18b could be equipped with a single jamming shoe, all the shoes provided being intended to revolve in the same diametral plane. Moreover, the general arrangement could be reversed. In fact, the central sleeve 2 could very easily constitute the driving element of the variator, in which case the outer drum 1 would constitute the driven element.

Figure 11:
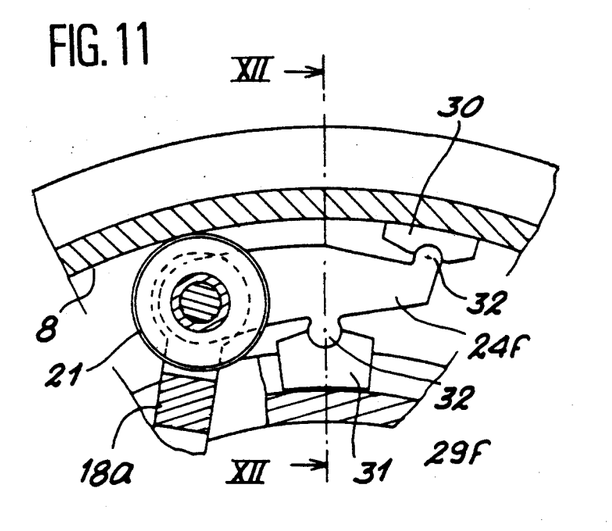
FIGS. 11 and 13 are views which are similar to FIG. 6 but show two further alternative forms of construction of the coupling components.
Figure 12:
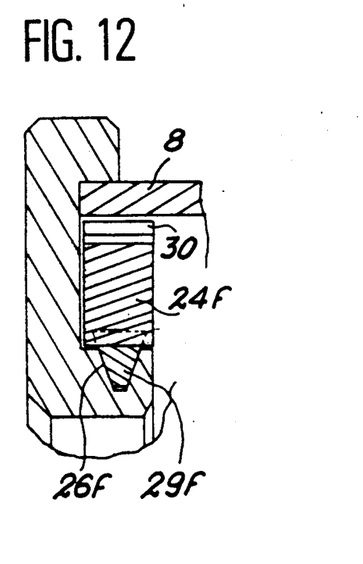
FIGS. 12 and 14 are corresponding views in cross-section taken respectively along lines XII—XII of FIG. 11 and XIV—XIV of FIG. 13.

FIGS. 11 and 12 illustrate another particular form of construction of the jamming shoes carried by the outer ends of the driving crank-arms 18a and 18b. This form of construction is so designed as to permit better adaptation of the bearing surfaces of these shoes to the corresponding jamming tracks. To this end, said bearing surfaces are constituted by two shoe-blocks 30 and 31 placed respectively against the outside and against the inside of the corresponding shoe body 24f. These two shoe-blocks are pivotally mounted on either side of the shoe body by means of bosses 32. This permits perfect adaptation of said shoe-blocks against the corresponding jamming walls. The outer surface of the shoe-black 30 has a curvature which is similar to that of the track constituted by the cylindrical ring 8. So far as the inner shoe-block 31 is concerned, this block has a wedge 29f for jamming it within the corresponding groove 26f in which it is placed. As in the previous embodiment, the outer end of the corresponding driving crank-arm is adapted to carry a roller 21 which is capable of rolling against the cylindrical track 8 when the respective shoe-blocks are not in the jamming position.

Figure 13:
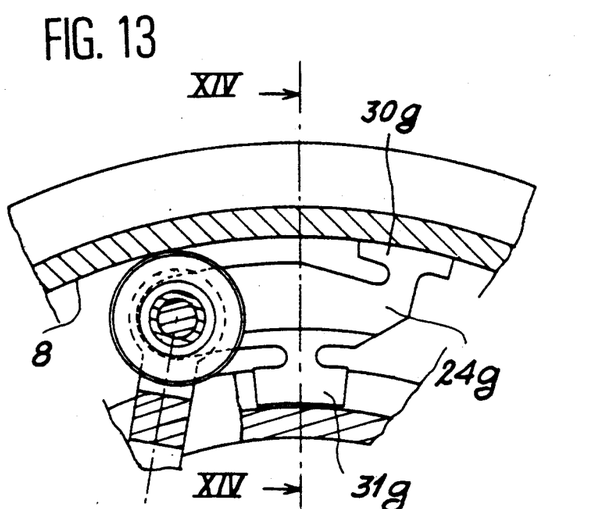
Figure 14:
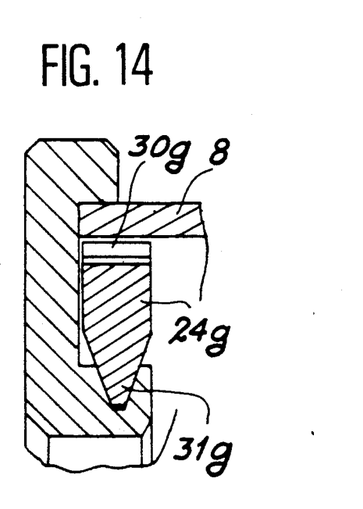

FIGS. 13 and 14 illustrate another form of construction which is designed for the same purpose as that illustrated in FIGS. 11 and 12, namely in order to permit perfect adaptation of the bearing surfaces of the coupling shoes against the corresponding jamming tracks. In this form of construction, said bearing surfaces are constituted by shoe-blocks 30g and 31g which are integral with the corresponding shoe body 24g. However, this latter has a profile such that said shoe-blocks have a certain freedom of orientation by resilient deformation of the zones of connection with the shoe body itself. This permits perfect adaptation to the corresponding jamming surfaces.

Figure 15:
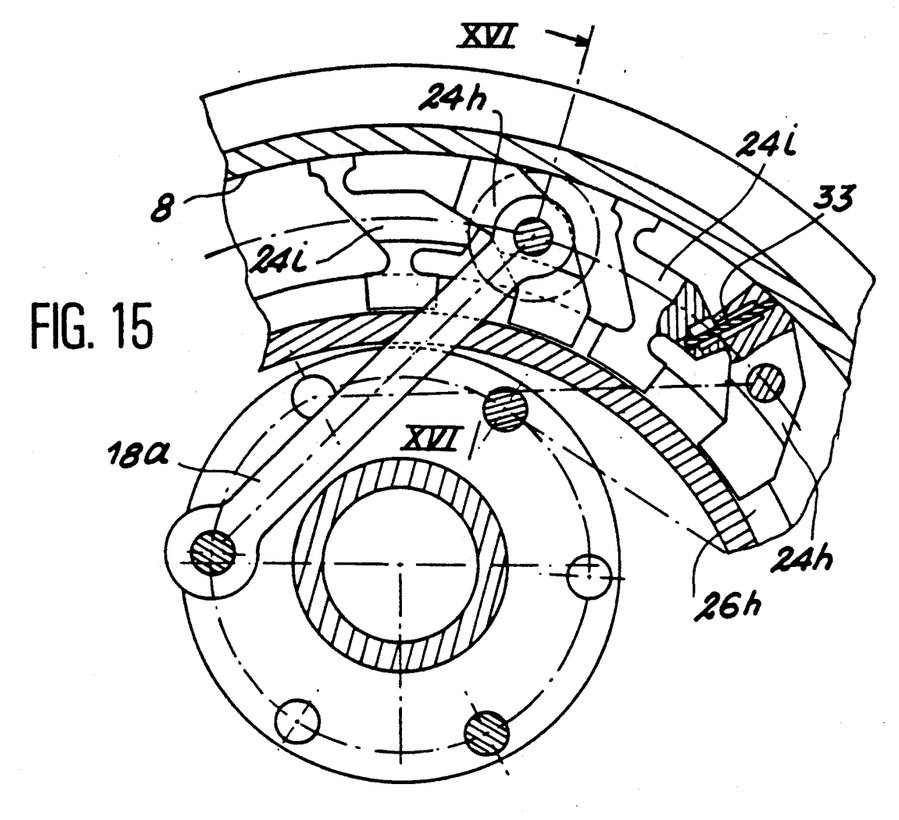
FIG. 15 is a fragmentary view which is similar to FIG. 2 but shows another form of construction.
Figure 16:
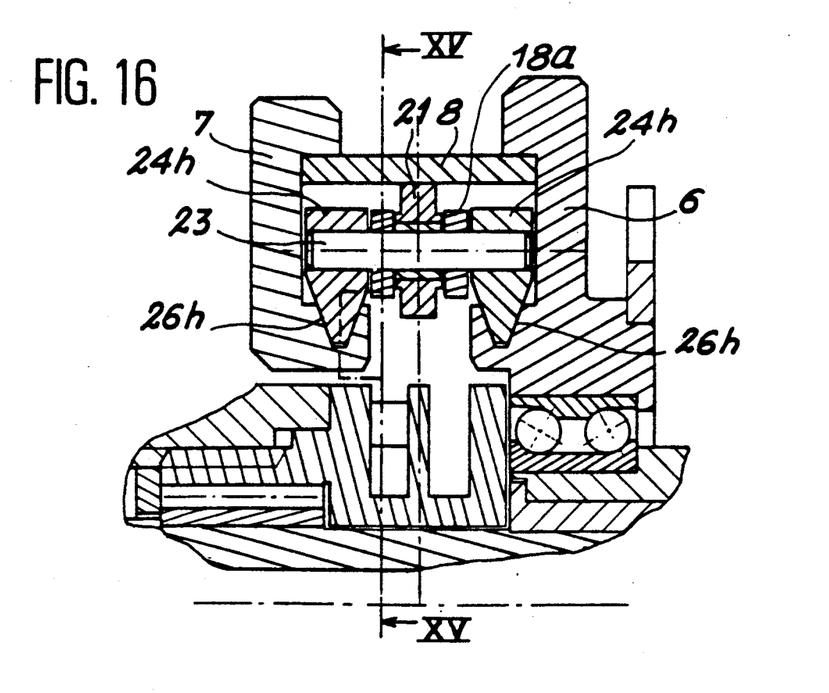
FIG. 16 is a fragmentary view in cross-section taken along line XVI—XVI of FIG. 15.

FIGS. 15 and 16 show another embodiment in which the coupling shoes are formed in two parts in such a manner as to ensure that jamming of these latter by abutment against the bearing tracks provided on each side can take place under excellent conditions even in the event of high speed of rotation of the variator. In such a case, in fact, centrifugal force may adversely affect the good jamming of the internal wedges of the coupling shoes within the corresponding grooves 26, 26d or 26e.

In order to solve this problem, each coupling shoe is made up of two separate parts, namely a main shoe 24h pivotally mounted at the end of the corresponding driving crank-arm, and a complementary shoe 24i on which the main shoe is capable of bearing and which is joined to this latter by means of a resilient bending element 33.

As shown in FIG. 16, the two main shoes 24h provided at the end of a driving crank-arm 18a or 18b are mounted on a shaft 23 which is carried by this latter and on which the corresponding roller 21 is also mounted. Each of these main shoes is coupled to a complementary shoe 24i. All these shoes are provided on the outside with a convex surface having the same curvature as the cylindrical track 8. On the inside, each main shoe 26h and the corresponding complementary shoe are each provided with a wedge engaged in a groove 26h of triangular cross-section. It should be noted in this connection that provision is made for two grooves 26h disposed in two parallel planes and each main shoe 24h and the corresponding complementary shoe 24i revolve within the same annular groove 26h.

When the side cheeks 6 and 7 of the drum undergo a displacement in the driving direction, the main shoes 24h coupled to the crank-arm 18a or 18b which is located in the driving position are applied on the corresponding complementary shoes 24i. As a result of friction, said shoes are locked in position against the jamming tracks, with the result that the main shoes are also locked in position against said tracks and this has the effect of driving the respective crank-arm and the hub.

The advantage of this system is that the complementary shoes jam irrespective of the reaction on the main shoes, jamming of said shoes being solely a function of the coefficient of friction and of geometrical parameters. Positional locking is thus ensured irrespective of the speed of rotation of the assembly.

The resilient coupling element 33 provided between each main shoe 24h and the corresponding complementary shoe 24i is also capable of taking up play if said element is slightly prestressed at the time of assembly.

As has already been indicated, the variator in accordance with the invention can be employed for applications other than the equipment of the driving rear wheel of a bicycle. This variator can in fact be employed in many other cases and within a broad range of different fields. It may thus be employed in motor vehicles or else in any machines or mechanical devices.

What is claimed is:

1. A speed variator comprising two elements consisting respectively of a driving element rotatable in one direction of rotation and a driven element rotatably mounted on two parallel axes, one of which is displaceable with respect to the other, said two elements being connected to each other by means of a series of driving crank-arms pivotally coupled at one end with one of said elements at different points of a circle having the same axis as said one element whilst their opposite end is intended to be coupled with the other element at a point of a circle having the same axis as said other element by unidirectional coupling means, wherein the means for coupling the driving crank-arms with one of the elements of said variator comprises shoes pivotally mounted on the corresponding ends of said crank-arms and each capable of jamming in turn on circular track means provided on the corresponding element of the variator whilst the other shoes then slide on said track, all the driving crank-arms being intended to revolve in the same diametral plane, said track means comprising two concentric jamming tracks provided on said corresponding element of said variator and said shoes jamming by abutment between said two concentric tracks at jamming points on said shoes, each coupling shoe being pivotally attached to the corresponding end of the respective driving crank-arm at a point which is angularly displaced behind said jamming points with respect to the direction of rotation of the driving element of the variator.

2. A speed variator according to claim 1, wherein one of the jamming tracks is cylindrical whereas the other track is constituted by an annular groove having a triangular or trapezoidal cross-section, the coupling shoes being provided in oppositely facing relation with bearing surfaces having the same shape.

3. A speed variator according to claim 1, wherein the jamming tracks provided on each side of the coupling shoes are each constituted by annular grooves of triangular or trapezoidal cross-section.

4. A speed variator according to claim 2, wherein each coupling shoe is provided opposite to the jamming track having a cylindrical surface with a roller which is intended to facilitate the free displacement of the corresponding shoe when said shoe is not in the jamming position.

5. A speed variator according to claim 1, wherein the driving crank-arms are disposed alternately in two parallel diametral planes and their free end carries two coupling shoes which are placed on each side and which in the case of all the crank-arms are located in two identical diametral planes in order to cooperate with two separate and distinct annular jamming grooves placed in said two planes and a common cylindrical ring.

6. A speed variator according to claim 1, wherein the bearing surfaces of the coupling shoes are constituted by shoe-blocks pivotally mounted against each side of said shoes.

7. A speed variator according to claim 1, wherein the bearing surfaces of the coupling shoes are constituted by shoe-blocks which are integral with the shoe bodies, each shoe body being so shaped as to ensure that said shoe-blocks have a certain freedom of displacement.

8. A speed variator according to claim 1, wherein the coupling shoes are formed in two portions, namely a main portion carried by the corresponding driving crank-arm and a complementary portion joined to the corresponding main portion by means of a coupling element, each main portion being intended to bear on the corresponding complementary portion.

* * * * *